Sept. 5, 1950 W. F. MITCHELL 2,521,179
APPARATUS FOR SPRAYING PLASTIC MATERIAL
Filed April 11, 1947 2 Sheets-Sheet 2
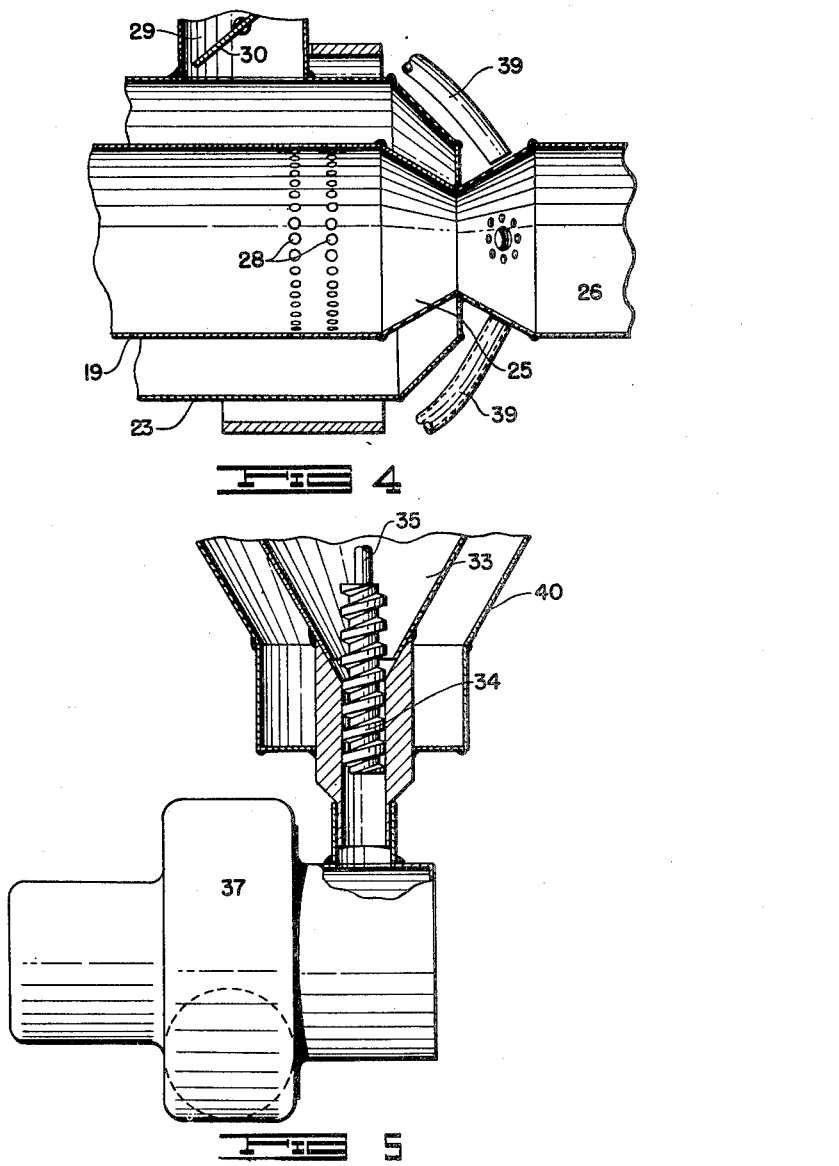
INVENTOR.
WILLIAM F. MITCHELL
BY
ATTORNEYS Patented Sept. 5, 1950

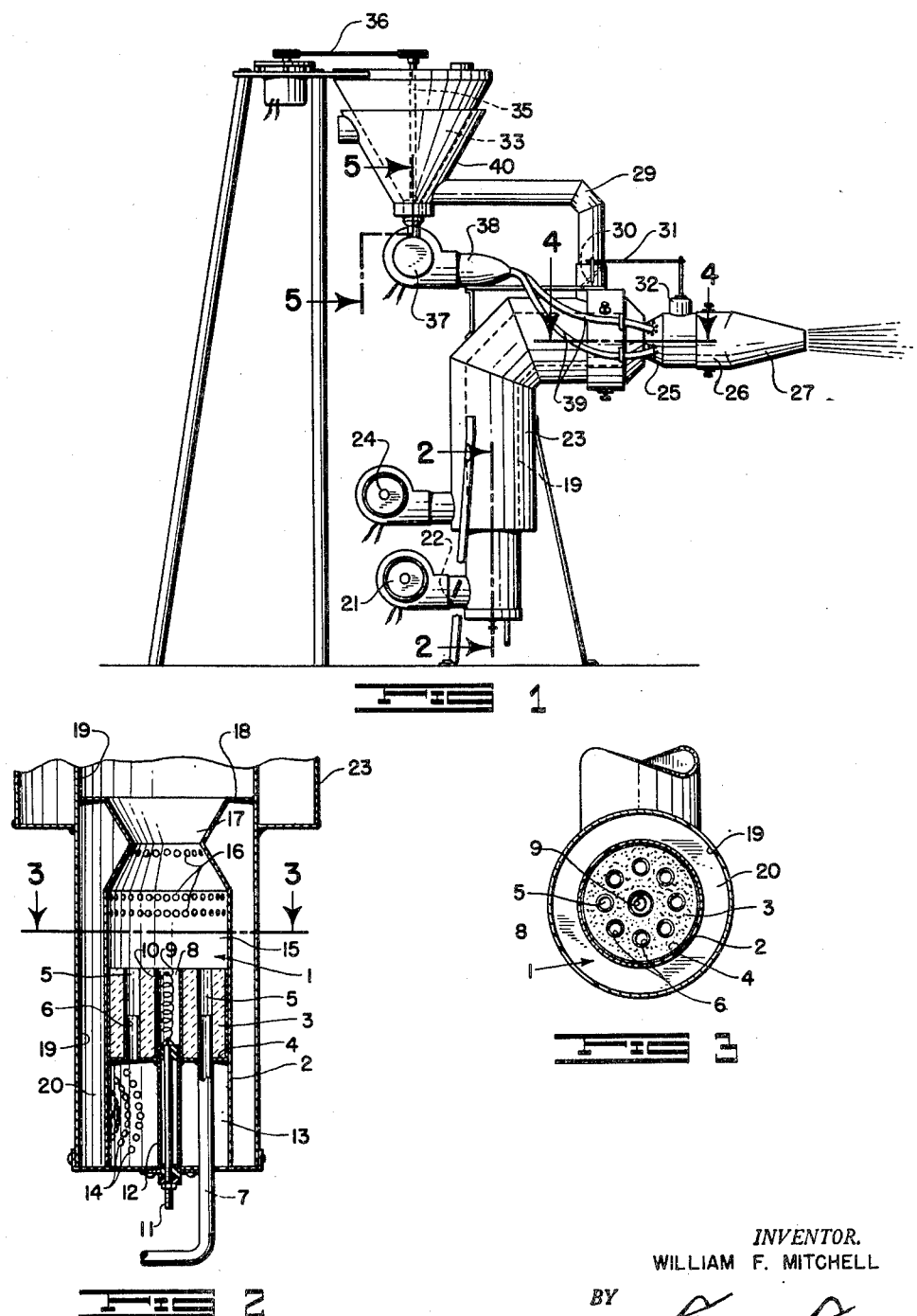

2,521,179

UNITED STATES PATENT OFFICE 2,521,179

APPARATUS FOR SPRAYING PLASTIC MATERIAL

William F. Mitchell, Arcadia, Calif., assignor of one-third to G. W. Abernathy, Arcadia, one-third to Bernard M. Laulhere, Los Angeles, Calif., one-sixth to Barnard M. Laulhere, Jr., and one-sixth to Leland F. Dishman Application April 11, 1947, Serial No. 740,847

5 Claims. (Cl. 91—12.2)

My invention relates to means and method of spraying plastic material, and included in the objects of my invention are:

First, to provide a means and method of spraying plastic material wherein the plastic material initially in powdered or granular form is entrained in a heated gaseous stream of large volume and relatively low velocity and blown or impelled by the gaseous stream against the surface to be coated.

Second, to provide a means and method of this character which incorporates a novel heater of inherently large heat capacity and a flue construction so arranged that the plastic material may be introduced directly into and heated by the products of combustion without contact with burning gases.

Third, to provide a means and method of this character which heats the surface to be coated so that the heated plastic material readily fuses and forms a dense impervious coating, thus providing a means and method of applying plastic material which is particularly suitable for coating pipe.

Fourth, to provide a means and method of this character which involves a simple yet effective arrangement for maintaining a substantially uniform temperature in the region in which the plastic material is introduced.

Fifth, to provide a means and method of this class which utilizes effectively the heat generated so that a large and constant volume of heated gases is maintained to insure proper heating of the plastic material as well as delivery of the material against the surface to be coated.

Further objects of the invention will appear hereinafter. Reference is directed to the accompanying drawings in which:

Figure 1 is a substantial diagrammatical side elevational view of my apparatus for spraying plastic material.

Figure 2 is an enlarged sectional view through 2—2 of Figure 1 showing particularly the burner or generator.

Figure 3 is a transverse sectional view thereof through 3—3 of Figure 2.

Figure 4 is an enlarged fragmentary sectional view through 4—4 of Figure 2.

Figure 5 is an enlarged pair and sectional parallel elevational view taken through 5—5 of Figure 1.

Heretofore attempts have been made to spray plastic material, particularly thermo-plastic material, by introducing the powder plastic material into a high velocity flame jet much in the manner in which metals have been successfully sprayed. This is not met with success for the reason that the plastic material is usually damaged by the excessive heat and the high velocity with which the material is directed against a surface to be coated as resulted in poor coverage, excessive loss and dissipation of the powder material and a substantial deterioration in the quality of the plastic material. I have found that by introducing air in excess quantities into a flame jet prior to introduction of the plastic material that the flame may be controlled so that it does not contact the material, and furthermore, the additional air enables the material to be entrained into a relatively slow-moving stream of comparatively large volume with the result that the condition of the powdered plastic material at the point of contact with the surface to be coated, is ideal for effective covering.

My apparatus includes a burner 1 employed to produce the heat necessary for effective softening of the plastic material to be sprayed. The burner is best illustrated in Figure 2. The burner comprises a heater housing 2 of hollow cylindrical form in which is mounted a burner block 3. The burner block is formed of porous ceramic material and is contained with a liner 4 which covers the bottom and sides of the burner plug. The burner plug is provided with axially extending perforations or passages 5 and the bottom of the liner 4 is provided with tubes 6 which extend upwardly approximately one-half way into the perforations 5. The tubes 6 are open-ended and sealed at their connections with the bottom of the liner 4 so that the liner may be filled with a liquid fuel to a depth not to exceed the lengths of the tubes 6. One of the tubes 6 connected with a fuel supply pipe 7 communicating with the lower end or bottom of the liner 4.

In addition to the tubes 6, the liner 4 is provided with a central tube 8 extending the height of the burner block 3. Within the tube 8 is mounted an ignition wire 9. The upper portion of the tube 8 is provided with one or more slots 10 exposing the burner block. The ignition wire 9 is connected to an insulated ignition lead 11 contained within a tube 12 extending downwardly from the line 4 and beyond the bottom of the burner 1.

The bottom of the housing 2 is closed and the portion thereof between its lower end and the burner block 3 forms a primary air chamber 13 having primary air intake ports 14 in the side walls of the housing 2. Above the burner block 3, the housing 2 forms a secondary air chamber also having lateral ports 16. The secondary air chamber 15 is provided with a discharge duct in the form of a venturi 17 which may also have lateral ports. The upper extremity of the housing 2 is provided with a flange 18 which engages the walls of a flue 19, the lower portion of which surrounds the housing 2, and forms therewith an annular air distributing chamber 20 which communicates with the chambers 13 and 15 through the ports 14 and 16, respectively. A blower 21 supplies air to the chamber 20. A damper 22 which may be either manually or automatically controlled may be interposed in the duct between the blower 21 and the chamber 20.

The flue 19 extends upwardly from the housing 2 and is preferably provided with a right angle bend so that the flue is in the form of an inverted L. The portion of the flue continuing from the housing 2 is surrounded by an air jacket 23. The air jacket is supplied with air from a blower 24. For convenience of illustration, independent blowers 21 and 24 are shown, however, air for the jacket 23 and chamber 20 may be supplied from a common source by suitable manifolding arrangements.

The extended end of the flue 19 is provided with a venturi 25 which communicates with a mixing chamber 26 terminating in a discharge nozzle 27. The air jacket 23 extends to the venturi 25. Adjacent the venturi 25 the flue 19 is provided with tertiary air intake ports 28 adapted to admit air from the air jacket 23 into the flue 19. The air jacket 23 is provided adjacent its extremity with an air outlet 29. The outlet contains a damper or regulating valve 30 which is actuated by control linkage 31 operatively connecting the damper with a thermostat unit 32 exposed to the temperature within the mixing chamber 26. The thermostat unit 32 is so arranged that should the temperature in the mixing chamber rise, the damper 30 restricts discharge of air through the air outlet 29 thereby increasing the air pressure in the jacket 23 and causing a greater quantity of the air to enter the ports 28.

Suitably mounted adjacent the apparatus comprising the burner and its flue and air jacket is a bin 33 which may be of conical form and provided with a screw feed 34 in its lower end. The bin is adapted to contain powdered plastic material and the screw feed is adapted to discharge this material at a predetermined rate. The screw feed is driven by a drive shaft 35 and drive means 36 such as a belt and motor unit. The screw feed discharges into a blower 37 which in turn communicates with a manifold 38 from which extend several ducts 39. The discharge end of the ducts are directed into the venturi 25 at equally spaced points.

It has been found desirable to preheat the contents of the bin 33 sufficiently to maintain the powdered plastic material in a free flowing condition. This is accomplished by connecting the air outlet 29 to a jacket 40 surrounding the bin 33.

Operation of my spraying apparatus for powdered plastic material is as follows:

Liquid fuel is introduced into the burner block 3 and maintained at a level below the upper extremity of the tube 6. The fuel is raised by capillary action into the upper portion of the ceramic burner block 3 and initially ignited by heating the ignition wire 9. Primary and secondary air enter the chambers 13 and 15, respectively, and the resulting burning products on combustion discharge upwardly through the flue 19. Air contained in the jacket 23 is preheated by the flue 19. This air is introduced through the tertiary air intake ports 28 in sufficient volume not only to insure complete combustion of any unburned fuel which may reach the ports 28, but also to lower the resulting temperature sufficiently to quench any flame before the gaseous stream enters the mixing chamber 26. By this means, the powdered plastic material entering through the ducts 39 does not come in contact with any flame but instead contacts the heated gases, principally air, mixes therewith, and is heated as it flows through the mixing chamber and discharges through the nozzle 27.

The optimum temperatures differ with different plastic materials. In any case, the temperature is so regulated that the powdered plastic material fuses into a homogeneous coating on the surface contacted by the spray issued from the nozzle 27. To accomplish this, the temperature of the air stream is, of course, above the fusing temperature of the thermo-plastic material. It should be observed that the velocity of the plastic laden heated air stream is relatively slow and that the volume of heated air in proportion to the plastic material is relatively large so that adjustments in order to maintain the optimum conditions are not critical. Furthermore, the large volume of air insures adequate heating of the surface to be coated, thereby insuring an even coating.

The apparatus here shown is particularly adapted for the spraying of pipe with a plastic coating intended to protect the pipe against corrosion when the pipe is buried in the ground. For such purposes, it is mandatory that the coating adhere strongly to the pipe and be entirely free of voids or pin holes.

The apparatus is also adapted to the spraying of tanks, the various pipe fittings such as pipe flanges and couplings and other structures subject to corrosion whether the structures are buried in the ground or exposed to atmosphere.

A thermo-plastic material, cellulose acetate butyrate, has been found suitable for use in my spraying apparatus. It is, of course, obvious that other thermo-plastic materials may be used.

It should be noted that the holes 14 which admit primary air to the chamber 13 also function as flame arrestors in the event that the air supply should be cut off and back flow should occur.

My method of spraying powdered plastic material consists essentially in burning a fuel air mixture, directing the burning mixture through a duct, introducing additional air into the burning mixture in sufficient quantity to quench any flame beyond a predetermined point in the duct while at the same time producing a relatively large volume of hot gases, mostly air. Into this flame-free air stream, there is introduced, at a predetermined rate, powdered plastic material. The material is heated as it flows with the air stream into contact with the surface to be coated.

Having fully described my invention, it is to be understood that I do not wish to be limited to the details set forth, but my invention is of the full scope of the appended claims.

I claim:

1. An apparatus for coating surfaces with plastic material, involving: fuel and air burner; a flue leading therefrom; a jacket for said flue; means for introducing air into said burner and into said jacket; means for introducing air from said jacket into said flue at a point spaced from said burner; means for introducing powdered plastic material into said flue subsequent to the point of introduction of the air from said jacket; means responsive to the temperature in the region of introduction of said plastic material for controlling the volume of air introduced from said jacket; thereby to maintain a predetermined temperature for said plastic material; and means for directing the contents of said flue including said plastic material against a surface to be coated.

2. An apparatus for coating surfaces with plastic material, involving: a fuel and air burner; a flue leading therefrom; a jacket for said flue; means for introducing air into said burner and into said jacket; a throttle controlled outlet for said jacket; said flue having perforations near said outlet to receive air from said jacket; control means responsive to temperatures in said flue beyond said perforations for regulating said outlet thereby to vary the volume of air entering said flue through said perforations; a discharge nozzle for said flue; and means for introducing powdered plastic material into said flue between said perforations and said nozzle.

3. An apparatus for coating surfaces with plastic material, involving: a fuel and air burner; a flue leading therefrom; a jacket for said flue; means for introducing air into said burner and into said jacket; a throttle controlled outlet for said jacket; said flue having perforations near said outlet to receive air from said jacket; control means responsive to temperatures in said flue beyond said perforations for regulating said outlet thereby to vary the volume of air entering said flue through said perforations; a discharge nozzle for said flue; a hopper for powdered plastic material; and a blower and duct means for receiving said material from said hopper and delivering the material into said flue in the region of uniform temperature established by said control means.

4. An apparatus for coating surfaces with plastice material, involving: a fuel and air burner; a flue leading therefrom; a jacket for said flue; means for introducing air into said burner and into said jacket; a throttle controlled outlet for said jacket; said flue having perforations near said outlet to receive air from said jacket; control means responsive to temperatures in said flue beyond said perforations for regulating said outlet thereby to vary the volume of air entering said flue through said perforations; a discharge nozzle for said flue; a hopper for powdered plastic material and a blower and duct means for receiving said material from said hopper and delivering the material into said flue in the region of uniform temperature established by said control means; and a pre-heating jacket for said hopper communicating with the outlet of said flue jacket.

5. An apparatus for coating surfaces with plastic material, including: means for producing a heated stream of combustion products; means for entraining additional air to extinguish any flame remaining in said stream at the point of introduction of the additional air; a Venturi passage, a mixing chamber and a nozzle adapted to pass said air agumented stream; means for introducing powdered plastic material into said venturi for mixture with said stream in said chamber and to discharge therewith through said nozzle; valve means for varying the entraining of said additional air in said heated stream; and control means responsive to temperatures in said mixing chamber to control said valve means.

WILLIAM F. MITCHELL.

REFERENCES CITED

The following references are of record in the file of this patent:

UNITED STATES PATENTS

| Number | Name | Date |
| --- | --- | --- |
| 941,630 | Edison | Nov. 30, 1909 |
| 1,128,059 | Schoop | Feb. 9, 1915 |
| 1,311,235 | Kenip | July 29, 1919 |
| 1,629,921 | Mansfield | May 24, 1927 |
| 1,755,846 | Steed | Apr. 22, 1930 |
| 1,781,603 | Schori | Nov. 11, 1930 |
| 1,971,804 | Alexander | Aug. 28, 1934 |
| 2,107,365 | Bray | Feb. 8, 1938 |
| 2,108,998 | Schori | Feb. 22, 1938 |
| 2,410,225 | Macht | Oct. 29, 1946 |
| 2,427,448 | Duccini | Sept. 16, 1947 |

FOREIGN PATENTS

| Number | Country | Date |
| --- | --- | --- |
| 348,187 | Great Britain | May 11, 1931 |